United States Patent
Germano et al.

(10) Patent No.: US 11,153,655 B1
(45) Date of Patent: Oct. 19, 2021

(54) CONTENT APPEAL PREDICTION USING MACHINE LEARNING

(71) Applicant: Amazon Technologies, Inc., Seattle, WA (US)

(72) Inventors: Vernon Germano, Bainbridge Island, WA (US); Kripa Kanchana Sivakumar, Seattle, WA (US); Xiang Hao, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 16/142,487

(22) Filed: Sep. 26, 2018

(51) Int. Cl.
| | |
|---|---|
| *H04N 21/25* | (2011.01) |
| *H04N 21/258* | (2011.01) |
| *H04N 21/45* | (2011.01) |
| *H04N 21/466* | (2011.01) |
| *H04N 21/475* | (2011.01) |
| *H04N 21/482* | (2011.01) |
| *G06N 5/04* | (2006.01) |
| *H04N 21/488* | (2011.01) |
| *G06N 20/00* | (2019.01) |

(52) U.S. Cl.
CPC ........... *H04N 21/4668* (2013.01); *G06N 5/04* (2013.01); *G06N 20/00* (2019.01); *H04N 21/4532* (2013.01); *H04N 21/4756* (2013.01); *H04N 21/4884* (2013.01)

(58) Field of Classification Search
None
See application file for complete search history.

(56) References Cited

U.S. PATENT DOCUMENTS

| | | |
|---|---|---|
| 8,706,655 B1 | 4/2014 | Rangarajan et al. |
| 9,674,579 B1 | 6/2017 | Jaini et al. |
| 10,242,080 B1 | 3/2019 | Cohen et al. |
| 10,630,562 B2 | 4/2020 | Harb |
| 10,643,074 B1 | 5/2020 | McAninly et al. |
| 10,897,649 B1 | 1/2021 | Germano et al. |
| 2007/0168853 A1 | 7/2007 | Jarman |
| 2008/0120345 A1 | 5/2008 | Duncombe |
| 2008/0250328 A1 | 10/2008 | Konttinen |
| 2009/0234831 A1 | 9/2009 | Ebadollahi et al. |
| 2012/0030554 A1 | 2/2012 | Toya |
| 2012/0276732 A1 | 11/2012 | Lin et al. |
| 2015/0058903 A1* | 2/2015 | Iyengar ............ H04N 21/44222 725/93 |
| 2015/0142753 A1 | 5/2015 | Soon-Shiong |
| 2016/0381320 A1 | 12/2016 | Mate et al. |

(Continued)

OTHER PUBLICATIONS

U.S. Appl. No. 16/003,748, filed Jun. 8, 2018, Mamdouh Mohamed Hamdy Abdu et al.

(Continued)

*Primary Examiner* — Brian T Pendleton
*Assistant Examiner* — Jean D Saint Cyr
(74) *Attorney, Agent, or Firm* — Weaver Austin Villeneuve & Sampson LLP

(57) ABSTRACT

Methods and apparatus are relating to the use of machine learning techniques to identify unrated content that will be appealing to particular demographics. Using explicit feedback (e.g., star ratings) and implicit feedback (e.g., viewing behavior) for a given demographic, feature sets are extracted from the rated titles and then used to recognize similar titles in unrated content.

20 Claims, 3 Drawing Sheets

(56) References Cited

U.S. PATENT DOCUMENTS

| | | | |
|---|---|---|---|
| 2017/0032820 A1 | 2/2017 | Davis, III et al. | |
| 2017/0113143 A1 | 4/2017 | Marr et al. | |
| 2017/0289589 A1 | 10/2017 | Koumchatzky et al. | |
| 2017/0289624 A1 | 10/2017 | Avila et al. | |
| 2017/0332113 A1 | 11/2017 | Haritaoglu et al. | |
| 2017/0359628 A1 | 12/2017 | Sachdev et al. | |
| 2018/0098125 A1 | 4/2018 | Bender et al. | |
| 2018/0189570 A1* | 7/2018 | Paluri | G06K 9/623 |
| 2018/0276565 A1 | 9/2018 | Brandao et al. | |
| 2019/0027162 A1 | 1/2019 | Fukayama et al. | |
| 2019/0036986 A1 | 1/2019 | Sathyanarayana et al. | |
| 2019/0215572 A1* | 7/2019 | Bagga | H04N 21/8355 |
| 2019/0258902 A1 | 8/2019 | Colligan et al. | |

OTHER PUBLICATIONS

U.S. Appl. No. 16/003,791, filed Jun. 8, 2018, McAninly et al.

U.S. Appl. No. 16/142,584, filed Sep. 26, 2018, Germano et al.

U.S. Office Action dated Nov. 29, 2019 issued in U.S. Appl. No. 16/003,791.

U.S. Notice of Allowance dated Feb. 27, 2020 issued in U.S. Appl. No. 16/003,791.

Bing Hu, Bin Liu, Neil Zhenqiang Gong, Deguang Kong, and Hongxia Jin. 2015. Protecting Your Children from Inappropriate Content in Mobile Apps: An Automatic Maturity Rating Framework. In Proceedings of the 24th ACM International on Conference on Information and Knowledge Management (CIKM '15) (Year: 2015).

P. Y. Lee, S. C. Hui and A. C. M. Fong, "Neural networks for web content filtering," in IEEE Intelligent Systems, vol. 17, No. 5, pp. 48-57, Sep.-Oct. 2002 (Year: 2002).

Acar E, Irrgang M, Maniry D, Hopfgartner F. Detecting violent content in hollywood movies and user-generated videos. InSmart Information Systems 2015 (pp. 291-314). Springer, Cham. (Year: 2015).

Celik, E. A. (Apr. 2017). Affective Analysis of Videos: Detecting Emotional Content in Real-Life Scenarios.Doctoral Thesis, Technische Universitat Berlin, http://dx.doi.org/10.14279/depositonce-5824 (Year: 2017).

U.S. Office Action dated Dec. 17, 2018 issued in U.S. Appl. No. 16/003,748.

U.S. Final Office Action dated Jun. 27, 2019 issued in U.S. Appl. No. 16/003,748.

U.S. Office Action dated Oct. 9, 2019 issued in U.S. Appl. No. 16/003,748.

U.S. Final Office Action dated May 20, 2020 issued in U.S. Appl. No. 16/003,748.

U.S. Office Action dated Sep. 15, 2020 issued in U.S. Appl. No. 16/003,748.

U.S. Office Action dated Jul. 23, 2020 issued in U.S. Appl. No. 16/142,584.

U.S. Notice of Allowance dated Oct. 5, 2020 issued in U.S. Appl. No. 16/142,584.

\* cited by examiner

CONTENT APPEAL PREDICTION USING MACHINE LEARNING

BACKGROUND

Content recommendation systems are used by video streaming services to select video titles for presentation in personalized user interface carousels. The intent is to provide recommendations of video content that will be appealing to the specific viewer interacting with the interface. The recommendations might be based, for example, on the viewer's viewing history, preferences expressed by the viewer, or the behavior of other viewers in the viewer's demographic. Based on such information, video titles that are considered to be similar to or related to the titles previously viewed, or appealing to others of the same demographic, are selected for presentation. However, the manner in which similarity is determined might be based on information such as genre classification or critical rating, metrics that can be arbitrary and subjective and therefore not entirely satisfactory. The large number of video titles also makes it difficult to scale such approaches, potentially missing many possible recommendations. Moreover, new or obscure titles that aren't yet rated or classified can't readily be identified using such techniques.

DETAILED DESCRIPTION

This disclosure describes the use of machine learning techniques for predicting the appeal of content to specific demographics. Viewer feedback from a population of user is used to identify content that is appealing to a particular demographic. Machine learning techniques are then trained on the identified content for the purpose of identifying new content that is also likely to be appealing to the same demographic. An example will be instructive.

Figure 1:
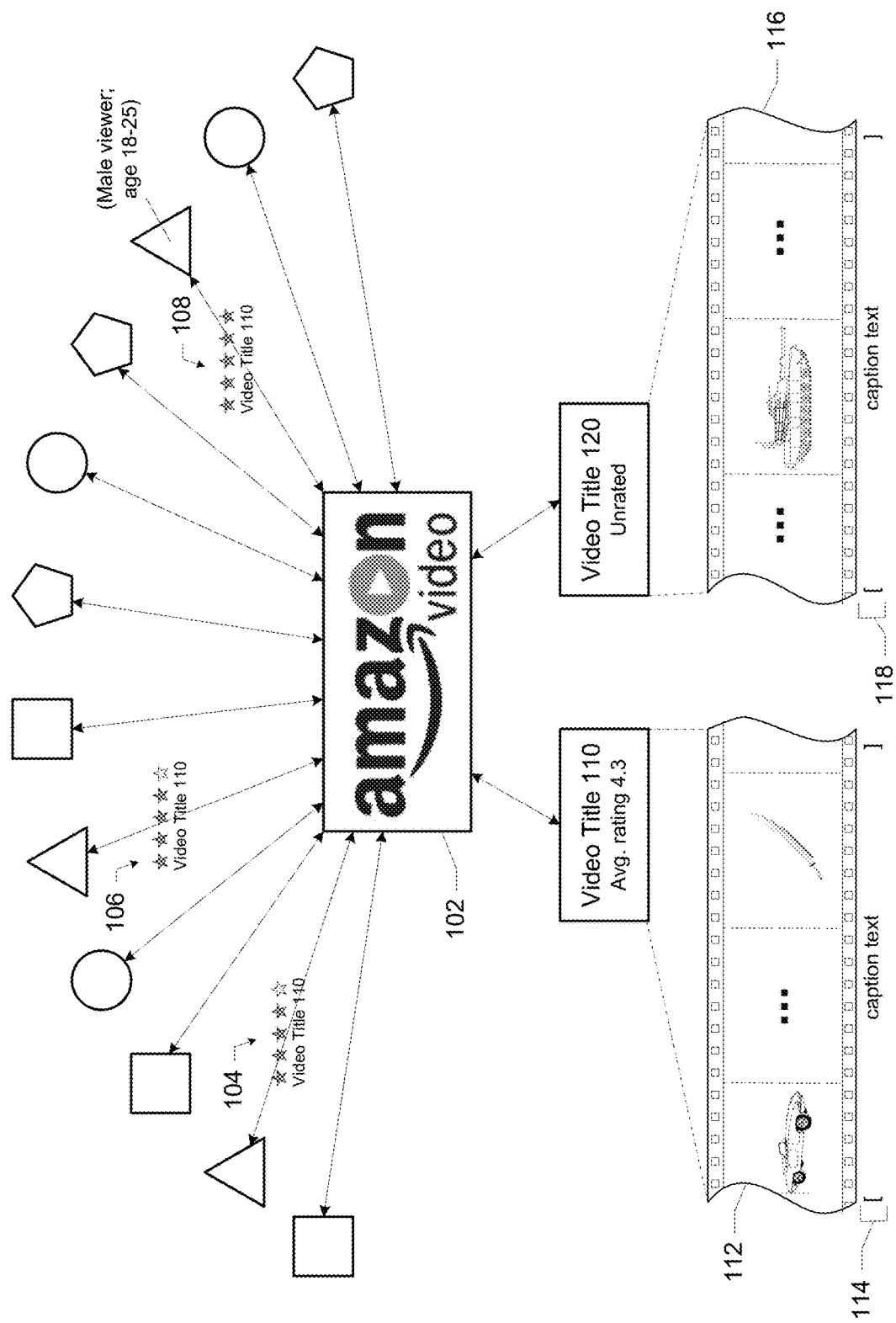
FIG. 1 is an illustration of a particular implementation enabled by the present disclosure.

FIG. 1 shows a network computing environment in which a diverse population of viewers (represented by the various geometric shapes) using a wide variety of client device types (not shown for clarity) accesses video content provided by an online video service 102 such as, for example, Prime Video from Amazon. In connection with viewing of video titles from the service's library of video content, many viewers provide explicit feedback about specific titles in the form of content ratings. These might take the form, for example, of "star ratings" (e.g., 104, 106, and 108) in which viewers assign ratings of one to five stars to the titles (e.g., video title 110). Implicit feedback (e.g., video completion rates) might also be collected by the video service.

Because the viewers are typically subscribers who register and interact regularly with the video service, the video service has a certain amount of demographic information about each viewer including, for example, demographic characteristics such as age, gender, geographic region, etc. Using this information in conjunction with the viewer feedback, the video service is able to identify content that is appealing to a subset of the viewers that correspond to a particular demographic profile. For example, as shown in FIG. 1, video title 110 has an average rating of 4.3 stars for male viewers aged 18-25 (represented by the triangles). This content is then used as training data for generating a machine learning model that is capable of identifying video content from among new and/or unrated video titles that is likely to be appealing to that same demographic.

Feature sets are extracted from each video title of the training data set. The features might include or be based on, for example, visual elements derived from frames 112 of the video title using computer vision techniques. For example, as shown in FIG. 1, sports cars and weapons might be recognized in a significant number of frames of title 110. In another example, extracted features might include text or linguistic features derived from the caption information 114 associated with the title. For example, the text descriptions of the audio track of title 110 might indicate things like "[vehicle engines revving]," or "[sword being drawn]." It will be understood that these two types of information are merely examples, and that a wide variety of other types of information might also be used to generate features for a content item.

Features sets are also extracted from new and/or unrated video titles for comparison with the features sets of the training set. In the example of FIG. 1, features extracted from frames 116 and captions 118 of video title 120 include the recognition of a military tank and character dialog including keywords like "mission" and a "tactics." In this example, comparison of the features of video title 110 and the features of video title 120 yields a high enough degree of similarity to confidently recommend video title 120 to male viewers aged 18 to 25 as another action film in which they might have an interest.

Figure 2:
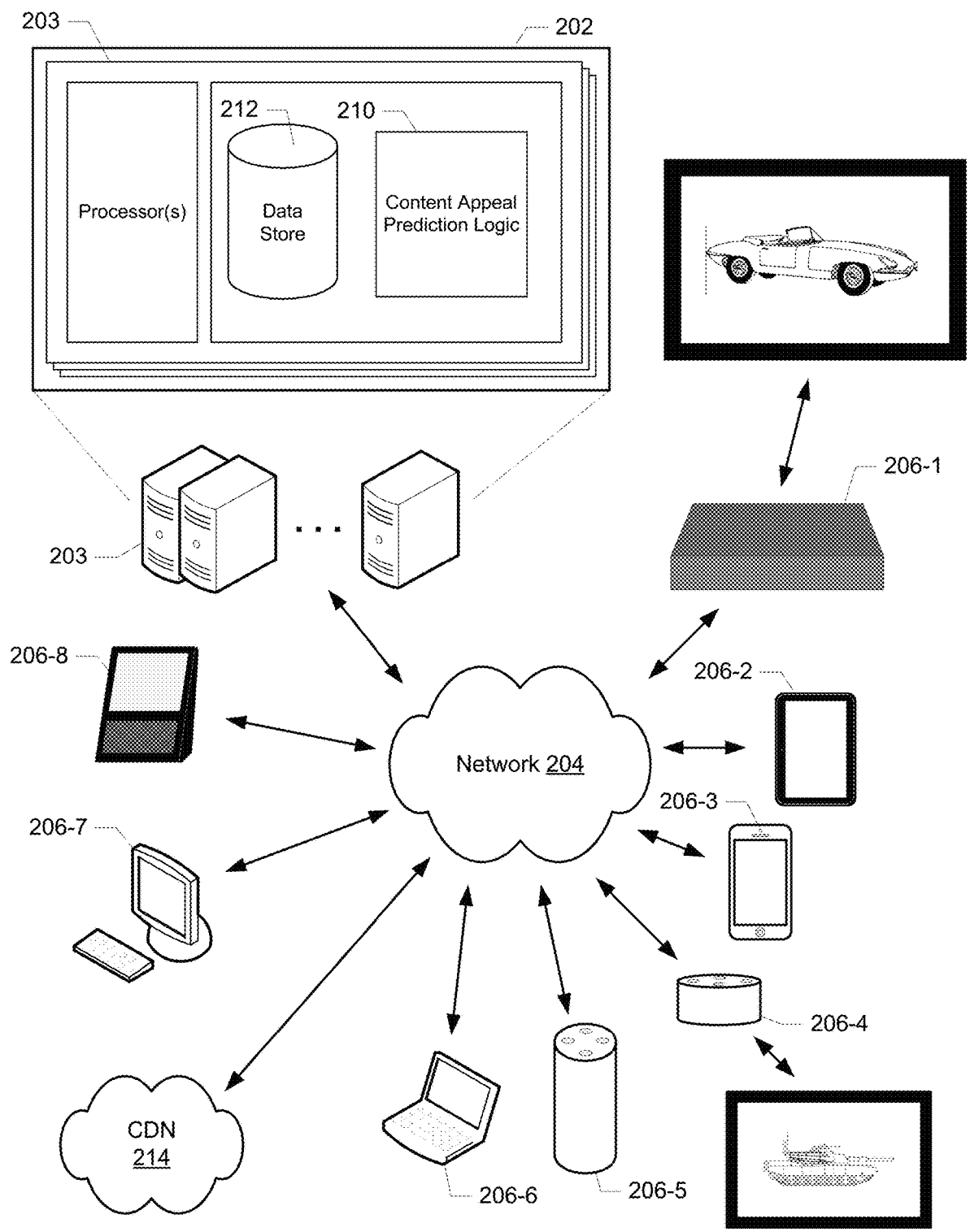
FIG. 2 is a simplified diagram of a computing environment in which various implementations enabled by the present disclosure may be practiced.

FIG. 2 illustrates an example of a computing environment in which streaming and on-demand content (including both video and audio) may be provided via network 204 to a variety of client devices (206-1 through 206-8) in accordance with the techniques described herein. Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to content appeal prediction logic 210, service 202 may include other types of logic (not shown) involved in the delivery of content as part of a video-on-demand service or a streaming video service.

In addition to predicting the appeal of content to various demographics, and providing access to video content, service 202 may also include a variety of information related to the video content (e.g., associated metadata and manifests in data store 212 which service 202 uses, or to which service 202 provides access). Data store 212 may also include user demographic profiles. Data store 212 may also include content features sets, data representing machine learning models, and recommender logic as described herein. Alternatively, at least some of this information may be provided and/or hosted by one or more separate platforms, e.g., CDN 214, or some other third-party platform. It should be noted that, while logic 210 and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
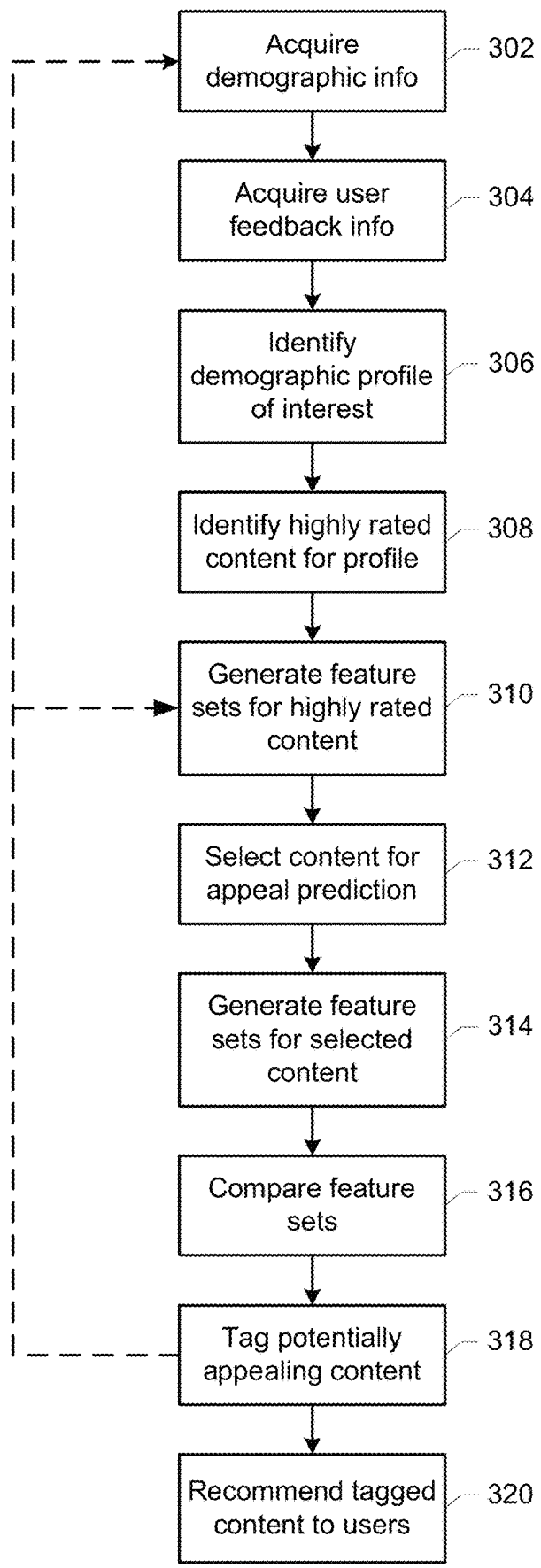
FIG. 3 is a flowchart illustrating operation of a class of implementations enabled by the present disclosure.

FIG. 3 is a flowchart illustrating various implementations in which machine learning techniques are employed for predicting the appeal of content to a particular demographic. Demographic information is acquired for a population of users (302). This may be done in connection with a content service that provides any of a wide variety of online content to its users using various streaming and/or on-demand mechanisms. The content may include, for example, video content, audio content, literary content, etc. The demographic information for the users may include information acquired as part of a registration process by which users sign up for the service. The demographic information may also include information that is acquired by virtue of the users' interactions with the content service or related services. For example, some information could be provided by users taking advantage of special offers provided by the service or specific feedback requested by the service. Some information might relate to the viewing history of the users.

The demographic information itself can be any of a wide variety of information that represents or defines a characteristic of a user. Such information might include, for example, age, gender, ethnicity, cultural heritage, current geographic location, geographic location of origin, explicitly and implicitly expressed preferences, viewing or listening history, online purchase history, social media posts, membership or affinity with online groups, etc.

User feedback regarding content provided to the population of users is also acquired (304). Such user feedback might include explicit ratings such as when, for example, users rate specific items of content using a mechanism provided by the content service, e.g., a percentage out of 100, a number of stars out of five stars, one or more thumbs up, etc. User feedback may also include implicit feedback that is inferred from a variety of user actions. This might include, for example, a completion rate that represents the number or percentage of users that played back substantially all of a particular content item. Feedback might also be derived from recommendations of content made by users to other people, or from informal reviews of content in text, emails, or social media posts. Various mechanisms that measure user attention could be leveraged for this purpose including, for example, eye-tracking software on user devices, detection of activity on the same or related devices, etc. Any information from which the appeal of particular content to a particular user or user demographic can be inferred could be employed as user feedback.

A particular demographic profile of interest is then identified or selected (306). This might be done manually by a human operator affiliated with the content service and/or might conform to classic or predefined demographic profile such as, for example, toddlers, teens, seniors, females in Taiwan, or males aged 18-25 as used in the example above. Alternatively, a demographic might be identified based on the user feedback itself. For example, the common characteristics of all users that rate a particular video title or set of video titles highly (e.g., 5 stars) could be used to construct a demographic profile. However it is accomplished, the demographic profile of interest represents a subset of the users having one or more demographic characteristics in common, and for which user feedback has been acquired.

Highly rated content for the selected demographic profile is identified (308). For cases in which feedback for particular content is used to define the profile, at least some of this content has already been identified. Alternatively, the user feedback for the selected demographic profile is processed to identify content items that are highly rated by users corresponding to that profile. This might be done, for example, by computing a representative rating or score (e.g., an average) for each content item based on the feedback for users of that demographic, and selecting the content items for which the representative rating or score exceeds some threshold. In the case of star ratings, highly rated content might correspond to content items for which the average star rating across the demographic is 4 stars or higher.

As mentioned above, various types of explicit feedback that are directly connected with a content item (e.g., percentage ratings, star ratings, etc.) are part of only one class of user feedback that could be employed to identify highly rated content. Various modes of implicit and/or indirect user feedback may be used as an alternative or in combination with such explicit feedback. For example, user viewing or listening histories can be leveraged to determine the percentage of the users in a demographic that play back all or a predetermined portion of a particular content item (e.g., completion rates), the percentage of users that playback a content item multiple times (e.g., 3 or more), or some other information that serves as a useful proxy for a favorable rating. In another example, various forms of analysis (e.g., text, linguistic, sentiment, emoji, etc.) of social media posts that relate to a particular content item can be performed to infer a rating or level of appeal for that content item for a given demographic.

Moreover, the manner in which each type of feedback may be used and/or combined with other types of feedback may vary considerably within the scope of this disclosure. For example, a low video completion rate for a given demographic might be used to reduce an average star rating for that demographic by some factor. In another example, the social media connections, level of activity, or influencer status of a particular user might be used to weight that user's contribution to the overall rating or score for the demographic. In yet another example, high recommendation rates within a particular demographic might be used to increase the rating for that demographic. From these example, the wide variety of feedback types and combinations that are within the scope of this disclosure will be apparent to those of skill in the art.

Whatever type or combination of feedback is used to identify highly rated content for a particular demographic, some or all of that highly rated content may then be used as training data to train a machine learning model to identify other content items that are likely to be appealing to that demographic. A feature set is generated for each of the content items in the training set (310). The types of features represented in the feature set, the manner in which the features are extracted or derived, and the way in which the feature set is constructed may vary considerably depending on the implementation, the type of content, the machine learning techniques employed, and a variety of other factors.

According to various implementations relating to video content or content including visual content, at least some of the features in the features set are generated using computer vision techniques that identify visual elements in the visual portion of the content, e.g., the video frames of video content. Any of a wide variety of feature extraction and detection models and tools may be employed. For example, an object detection neural network such as the AlexNet convolutional neural network or any model supported by the Caffe deep learning framework might be used. Other suitable tools, models, and frameworks known to those of skill in the art may also be suitable for particular implementations.

In addition, the nature of the visual elements that may be recognized for this purpose may vary considerably depending on the implementation. For example, the visual elements might be specific objects or object types (e.g., weapons, vehicles, humans, animals, popular brands, etc.). In another example, the visual elements might be specific actors or characters. In another example, the visual elements might be more abstract such as the production style, overall look and feel, or visual features that are characteristic of particular types of content. For example, the level of motion from frame to frame might be indicative of an action film, or the design aesthetic of a video title might include bright, primary colors indicative of children's content, or the range of colors and image resolution might be indicative of animated content. Anything that computer vision techniques are capable of identifying from the visual components of a content item may be the basis for a feature in the feature set.

The way in which a recognized visual element may be represented in a feature set may also vary considerably. For example, each recognition of a weapon or nudity in a video title might contribute to a violence count feature or a sexuality count feature for that title, with different types of elements within each feature category possibly contributing differently to its count, and with different ranges of the count corresponding to different levels of that feature (e.g., none, mild, moderate, excessive, etc.). Recognition of a particular animated character popular with toddlers might set a children's content feature to a "1" rather than "0," or could be represented as a score in the range from 0 to 1 that is based on the number of recognitions or the overall time on the screen. The proportion of scenes in a movie title with a high degree of motion could be represented as a score that is representative of the likelihood the title is an action film. Again, those of skill in the art will understand the broad range of possibilities from the diversity of these examples.

It should be noted that implementations are also contemplated in which visual elements that are the basis of features in the feature set may be recognized using mechanisms other than computer vision techniques. For example, motion vectors that are generated as part of the video encoding process may be used to identify and/or quantify motion in a video title. More generally, any visual elements that have representative signatures or characteristics associated with the encoding and decoding of video data may also be leveraged in this manner.

According to some implementations, caption information associated with video content may be used to derive features for the feature set. For example, any of a variety of conventional or proprietary natural language processing and text mining techniques may be used to process caption information to identify keywords, concepts, topics, sentiment, language, profanity, conversational tone, etc. (including the frequency of any of these), as well as correlations of any of these with violence, sexuality, etc. As with the features representing visual elements, the features for caption information may represented in a wide variety of ways.

Metadata associated with content items may also be a source of information to generate features for the feature set. Such information might include, for example, the genre of the content (e.g., suspense, action, or romantic comedy for video content, or hip-hop, jazz, or alternative-rock for music content), people associated with the content (e.g., actors, directors, artists, musicians, etc.), critical reviews (e.g., professional critic ratings), association ratings (e.g., MPAA ratings), etc. Again, features based on such information may be represented in a variety of ways.

Other possible sources of information for feature generation may include data representing user behavior. For example, patterns in the way in which users interact with or consume content might be the basis of features. This might include when content is consumed, e.g., time of day, day of the week, seasonal variations, etc. In one example, certain content items might be viewed largely during the time of day considered to be "family viewing hours," e.g., 6 pm-8 pm. Such information might, particularly when combined with other features, be indicative of content that is suitable for all audiences. Variations on these themes will be apparent to those of skill in the art.

The features within a feature set, and corresponding features across features sets may be included/excluded and/or weighted in various ways for the purpose of improving the confidence in the appeal predictions made based on the corresponding model over time. For example, for video content for toddlers, bright colors might be important, so a video theme feature might be weighted more highly than a dialogue feature. In another example, visual content features might be deemphasized relative to caption features for standup comedy because the visuals for most standup comedy content are fairly consistent across titles and therefore not as important as the dialogue.

Initially, features may be included/excluded and weights may be applied as a result of decisions by human operators that are based on an initial understanding of the relative importance of the various features for certain types of content or for particular demographics. This understanding may be derived from a variety of sources including, for example, intuition, market research, or human evaluation of the content in the training data set. As will be appreciated by those of skill in the art, the weights may evolve over time as the underlying machine learning models evolve along with the understanding of what features correlate more or less strongly with the appeal of particular content to specific demographics.

Referring back to FIG. 3, a set of content items is selected for prediction of the appeal of the content items to the selected demographic (312). The content items in this set may be, for example, content for which rating data are not available or are not considered reliable, e.g., new content, obscure content, etc. A feature set is generated for each of the content items in this set (314). These feature sets may be constructed and weighted in a manner similar to those that are generated for the training data set, and so might be informed by or specific to the selected demographic, the machine learning model, the type of content (e.g., as indicated in metadata), etc.

The feature sets for the newly selected content items are compared with the feature sets for the content items in the training data set to identify any of the new content items that are likely to be appealing to the demographic of interest (316). Generally speaking, machine learning involves the construction of a model (e.g., on which the feature sets are based), and the evaluation of that model with respect to a metric of interest (e.g., the prediction of content appeal to a particular demographic). Comparison of feature sets may be accomplished using any of a wide variety of techniques. For example, where the feature sets are represented by corresponding feature vectors, similarity to existing feature vectors (e.g., features sets representing appealing content) can be determined using techniques such as nearest neighbor classification and neural networks, or statistical approaches as exemplified by Bayesian techniques.

New content items that are sufficiently similar to one or more of the content items in the training data set are designated for recommendation to users corresponding to the demographic of interest (318). Sufficient similarity might be determined in a variety of ways. For example, the confidence level associated with a comparison to a content item in the training data set might be greater than a predetermined threshold. In addition or alternatively, a new content item might match or be similar to some programmable number of content items in the training data set. The manner in which similarity is determined and the degree of similarity required may vary depending on the implementation.

As indicated by the dashed line in FIG. 3, the identification of appealing content can be reiterated for the same demographic, or performed for different demographics, resulting in evolution of the underlying models for each demographic.

Once a content item has been designated as appealing to a particular demographic, that content item may then be recommended to specific users that correspond to that demographic (320). This might be done, for example, by including a representation of or a link to the content item in a list or carousel of content items presented in a user interface associated with a content service. Alternatively, the recommendation might be communicated in other ways such as, for example, in a social media feed or in various types of electronic messages (e.g., texts and emails). As another alternative, the recommendation might be presented as a sponsored entry in a list of search results.

As mentioned above, the interaction of users corresponding to the demographic of interest with the content items predicted to be appealing to them can inform and guide the evolution of the underlying machine learning model on which recommendations are based. That is, the accuracy of the predictions made by each model can be tested based on whether or not users of the corresponding demographic actually provide feedback that corresponds to a high rating for those content items.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
identifying a first plurality of content items, each of the first plurality of content items having a content score for a first demographic profile that exceeds an appeal threshold, each content score being based on interactions of a first plurality of users of the first demographic profile with the corresponding content item;
generating a feature set for each of the first plurality of content items, including processing each of the first plurality of content items using a computer vision technique to identify first visual elements from video frames of the first plurality of content items, features in the feature sets for the first plurality of content items representing the first visual elements;
generating a feature set for each of a second plurality of content items, including processing each of the second plurality of content items using the computer vision technique to identify second visual elements from video frames of the second plurality of content items, features in the feature sets for the second plurality of content items representing the second visual elements;
applying weights to at least some of the features in each of the feature sets based on one or both of the first demographic profile and a content type of the corresponding content item;
using a machine learning model, identifying a first content item from the second plurality of content items by comparing the feature sets for the first plurality of content items with the feature sets for the second plurality of content items; and
designating the first content item for recommendation in connection with the first demographic profile.

2. The method of claim 1, wherein the content score for each of the first plurality of content items is based on one or more of content ratings entered by the first plurality of users, content consumption behavior of the first plurality of users, or social media posts by the first plurality of users.

3. The method of claim 1, wherein each feature set also includes features derived from caption data of the corresponding content item.

4. The method of claim 3, wherein each feature set also includes third features derived from content metadata of the corresponding content item.

5. The method of claim 1, further comprising recommending the first content item to a first user corresponding to the first demographic profile.

6. The method of claim 1, wherein the feature sets for the first plurality of content items employ first feature weights corresponding to the first demographic profile, the method further comprising:
   obtaining a feature set for each of a third plurality of content items, the feature sets for the third plurality of content items employing second feature weights corresponding to a second demographic profile;
   identifying a second content item from the second plurality of content items by comparing the feature sets for the third plurality of content items with the feature sets for the second plurality of content items; and
   designating the second content item for recommendation in connection with the second demographic profile.

7. The method of claim 1, wherein the feature sets for the first plurality of content items employ first feature weights, the method further comprising:
   identifying a third plurality of content items, each of the third plurality of content items having a content score for the first demographic profile that exceeds an appeal threshold, each content score being based on interaction of a second plurality of users of the first demographic profile with the corresponding content item;
   obtaining a feature set for each of the third plurality of content items, the feature sets for the third plurality of content items employing second feature weights that are modified relative to the first feature weights based on a correlation between one or more specific features and favorable scores associated with the first demographic;
   identifying a second content item from the second plurality of content items by comparing the feature sets for the third plurality of content items with the feature sets for the second plurality of content items; and
   designating the second content item for recommendation in connection with the first demographic profile.

8. The method of claim 1, further comprising identifying the first demographic profile based on one or more of the first plurality of content items and the interactions of the first plurality of users with the one or more of the first plurality of content items.

9. The method of claim 1, evolving the machine learning model representing appealing content for the first demographic profile based on the feature sets for the first plurality of content items, the interactions of the first plurality of users with the first plurality of content items, the feature set for the first content item, and interactions of a second plurality of users with the first content item.

10. A computer program product, comprising one or more non-transitory, computer-readable media having computer program instructions stored therein, the computer program instructions being configured such that, when executed by one or more computing devices, the computer program instructions cause the one or more computing devices to:
   identify a first plurality of content items, each of the first plurality of content items having a content score for a first demographic profile that exceeds an appeal threshold, each content score being based on interactions of a first plurality of users of the first demographic profile with the corresponding content item;
   generate a feature set for each of the first plurality of content items, including processing each of the first plurality of content items using a computer vision technique to identify first visual elements from video frames of the first plurality of content items, features in the feature sets for the first plurality of content items representing the first visual elements;
   generate a feature set for each of a second plurality of content items, including processing each of the second plurality of content items using the computer vision technique to identify second visual elements from video frames of the second plurality of content items, features in the feature sets for the second plurality of content items representing the second visual elements;
   apply weights to at least some of the features in each of the feature sets based on one or both of the first demographic profile and a content type of the corresponding content item;
   use a machine learning model to identify a first content item from the second plurality of content items by comparing the feature sets for the first plurality of content items with the feature sets for the second plurality of content items; and
   designate the first content item for recommendation in connection with the first demographic profile.

11. The computer program product of claim 10, wherein the content score for each of the first plurality of content items is based on one or more of content ratings entered by the first plurality of users, content consumption behavior of the first plurality of users, or social media posts by the first plurality of users.

12. The computer program product of claim 10, wherein each feature set also includes features derived from caption data of the corresponding content item.

13. The computer program product of claim 12, wherein each feature set also includes third features derived from content metadata of the corresponding content item.

14. The computer program product of claim 10, wherein the computer program instructions are further configured to cause the one or more computing devices to recommend the first content item to a first user corresponding to the first demographic profile.

15. The computer program product of claim 10, wherein the feature sets for the first plurality of content items employ first feature weights corresponding to the first demographic profile, and wherein the computer program instructions are further configured to cause the one or more computing devices to:
   obtain a feature set for each of a third plurality of content items, the feature sets for the third plurality of content items employing second feature weights corresponding to a second demographic profile;
   identify a second content item from the second plurality of content items by comparing the feature sets for the third plurality of content items with the feature sets for the second plurality of content items; and
   designate the second content item for recommendation in connection with the second demographic profile.

16. The computer program product of claim 10, wherein the feature sets for the first plurality of content items employ first feature weights, and wherein the computer program instructions are further configured to cause the one or more computing devices to:
   identify a third plurality of content items, each of the third plurality of content items having a content score for the first demographic profile that exceeds an appeal threshold, each content score being based on interaction of a second plurality of users of the first demographic profile with the corresponding content item;
   obtain a feature set for each of the third plurality of content items, the feature sets for the third plurality of content items employing second feature weights that are modified relative to the first feature weights based on a correlation between one or more specific features and favorable scores associated with the first demographic;

identify a second content item from the second plurality of content items by comparing the feature sets for the third plurality of content items with the feature sets for the second plurality of content items; and designate the second content item for recommendation in connection with the first demographic profile.

17. The computer program product of claim 10, wherein the computer program instructions are further configured to cause the one or more computing devices to identify the first demographic profile based on one or more of the first plurality of content items and the interactions of the first plurality of users with the one or more of the first plurality of content items.

18. A system, comprising one or more computing devices including one or more processors and memory configured to:

identify a first plurality of content items, each of the first plurality of content items having a content score for a first demographic profile that exceeds an appeal threshold, each content score being based on interactions of a first plurality of users of the first demographic profile with the corresponding content item;

generate a feature set for each of the first plurality of content items, including processing each of the first plurality of content items using a computer vision technique to identify first visual elements from video frames of the first plurality of content items, features in the feature sets for the first plurality of content items representing the first visual elements;

generate a feature set for each of a second plurality of content items, including processing each of the second plurality of content items using the computer vision technique to identify second visual elements from video frames of the second plurality of content items, features in the feature sets for the second plurality of content items representing the second visual elements;

apply weights to at least some of the features in each of the feature sets based on one or both of the first demographic profile and a content type of the corresponding content item;

use a machine learning model to identify a first content item from the second plurality of content items by comparing the feature sets for the first plurality of content items with the feature sets for the second plurality of content items; and designate the first content item for recommendation in connection with the first demographic profile.

19. The system of claim 18, wherein the feature sets for the first plurality of content items employ first feature weights corresponding to the first demographic profile, and wherein the one or more processors and memory of the one or more computing devices are further configured to:

obtain a feature set for each of a third plurality of content items, the feature sets for the third plurality of content items employing second feature weights corresponding to a second demographic profile;

identify a second content item from the second plurality of content items by comparing the feature sets for the third plurality of content items with the feature sets for the second plurality of content items; and designate the second content item for recommendation in connection with the second demographic profile.

20. The system of claim 18, wherein the feature sets for the first plurality of content items employ first feature weights, and wherein the one or more processors and memory of the one or more computing devices are further configured to:

identify a third plurality of content items, each of the third plurality of content items having a content score for the first demographic profile that exceeds an appeal threshold, each content score being based on interaction of a second plurality of users of the first demographic profile with the corresponding content item;

obtain a feature set for each of the third plurality of content items, the feature sets for the third plurality of content items employing second feature weights that are modified relative to the first feature weights based on a correlation between one or more specific features and favorable scores associated with the first demographic;

identify a second content item from the second plurality of content items by comparing the feature sets for the third plurality of content items with the feature sets for the second plurality of content items; and designate the second content item for recommendation in connection with the first demographic profile.

* * * * *